UNITED STATES PATENT OFFICE.

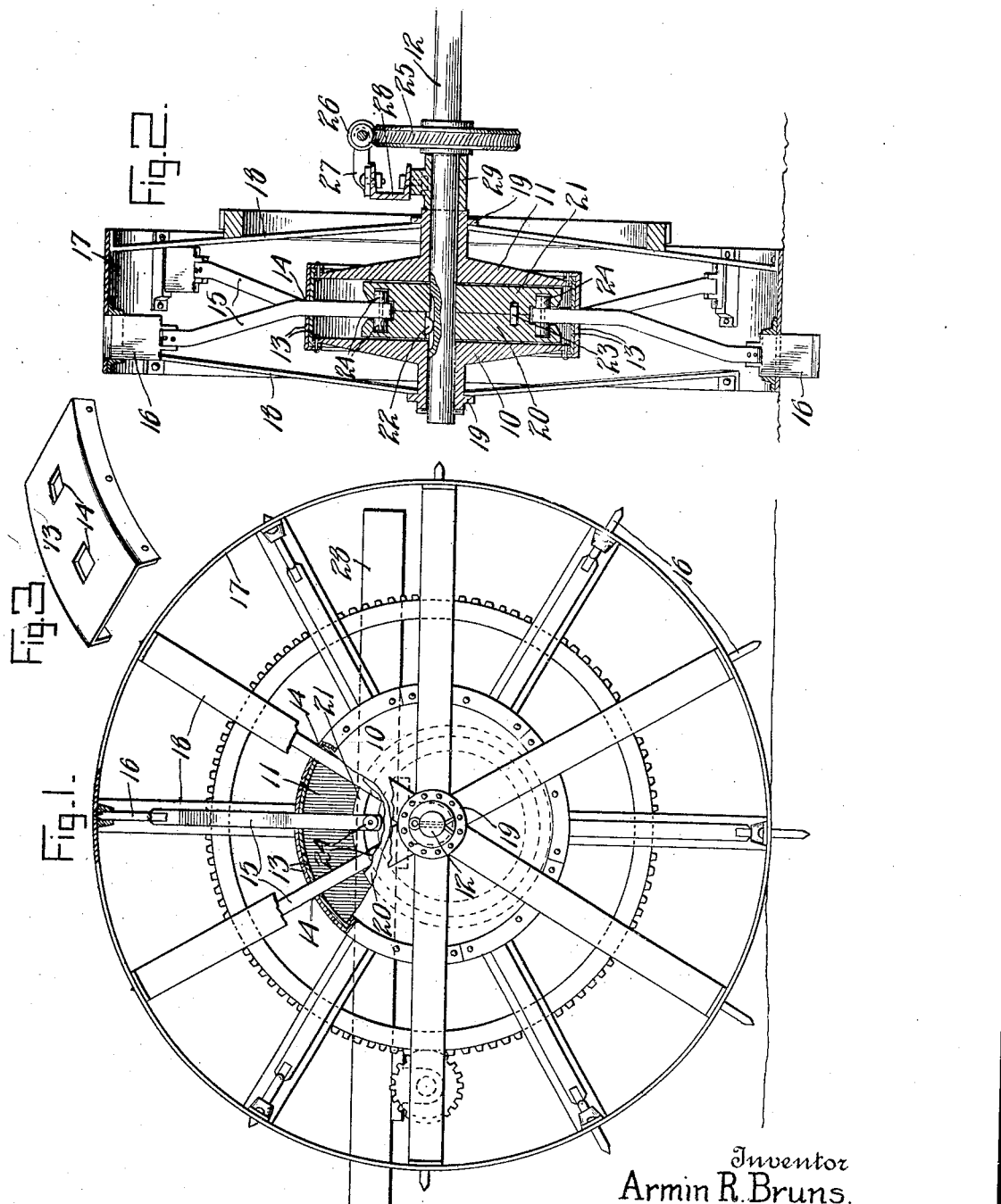

ARMIN R. BRUNS, OF SIGOURNEY, IOWA.

TRACTOR-WHEEL.

1,354,723.  Specification of Letters Patent.  Patented Oct. 5, 1920.

Application filed May 1, 1919. Serial No. 293,935.

*To all whom it may concern:*

Be it known that I, ARMIN R. BRUNS, a citizen of the United States, residing at Sigourney, in the county of Keokuk and State of Iowa, have invented certain new and useful Improvements in Tractor-Wheels, of which the following is a specification.

My said invention consists in certain improvements in the details of construction and arrangement of parts of wheels for tractors wherein the traction blades are caused to project and recede through openings in the rim of the wheel, and the degree of the projection may be controlled or regulated as desired. Also whereby a wheel of the type mentioned is provided that is simple in structure and comparatively inexpensive, all of which will be hereinafter more fully described and claimed.

Referring to the accompanying drawings which are made a part thereof and on which similar reference characters indicate similar parts:

Figure 1 is a side elevation of a wheel constructed in accordance with my said invention, certain portions being broken away to show the construction more clearly, Fig. 2 a vertical section through the wheel, and Fig. 3 a detail perspective of one of the parts.

Said wheel comprises hub parts 10 and 11 mounted on the axle 12. Said hub parts are in form of disks spaced apart and are provided with a rim composed of metal sections 13 of the form most clearly shown in Fig. 3. Each section is in the segment of a circle and formed with inturned flanges which are secured to the disks 10 and 11 near their peripheries by rivets as shown. Said parts 13 are preferably duplicates except that the inner series are narrower and have flanges narrower than the outer series and are arranged one upon another, the joints between the ends of the sections of the same series abutting and those of the outer series overlapping those of the inner series so that the ends of each segment are positioned at the middle of the overlying or underlying segment. Perforations 14 are provided through which the arms 15 of the traction blades 16 project, the two perforations of one segmental section registering with the end perforations of the juxtaposed two sections whereby each of the arms 15 passes through the perforations of an underlying and an overlying section. Said traction blades 16 are riveted to the outer ends of said arms 15 and project through slots in the rim 17 of the wheel.

Said rim 17 is connected by spokes 18 with flanges 19 on the outer ends of the hub parts 10 and 11, as shown.

Within the casing, formed between the disks 10 and 11, is mounted a cam composed of two parts 20 and 21, the adjacent faces of which are grooved. The part 20 is keyed to the shaft 12 by a key 22, and the part 21 is secured to revolve with the part 20 by means of dowel pins 23.

The inner ends of arms 15 have transverse pins on which are mounted anti-friction rollers 24 which are mounted in and are adapted to be operated by the groove in the cam composed of the parts 20 and 21.

In the arrangement shown in the drawings, the traction blades 16 are adapted to project beyond the rim 17 when the wheel turns to bring the blade toward the ground so that when the blade is in a vertical position it projects its extreme length. In order to provide for varying this projection, however, I mount a worm wheel 25 on shaft 12 which is connected to be operated by a worm gear 26 mounted in a bracket 27 on a portion 28 of the frame supported upon a collar 29 on the shaft. As will be readily seen, the turning of gear 26 will operate and turn shaft 12 so as to change the relative position of the cam and consequently its position in relation to the tread of the wheel and the point at which the traction blade will be projected. By this means when the wheel is traveling over a paved surface, or otherwise; when no projection of the blades is required or desired for traction purposes, the cam is adjusted so that the blades will project from the wheel above the surface and be withdrawn when the wheel approaches the surface, thus causing the wheel to be used to the best advantage under all conditions.

Having thus fully described my said invention what I claim as new and desire to secure by Letters Patent is:

A traction wheel comprising a rim, hub and spokes, said hub forming a cylindrical casing provided with a rim composed of removable segmental sections having spaced slots, the sections formed and adapted to be placed one over the other, the slots of the upper and lower sections coinciding, and overlapping the sides of the casing and secured thereto, a cam within the casing, traction blades adapted to reciprocate through slots in the casing and in the rim of the wheel, the blades being actuated by the cam substantially as described.

In witness whereof, I have hereunto set my hand and seal at Sigourney, Iowa, this 18th day of April, A. D. nineteen hundred and nineteen.

ARMIN R. BRUNS. [L. S.]

Witnesses:
CHAS. C. HENINGER,
ARCHIE W. BAKEHOUSE.